United States Patent
Kawashima et al.

(10) Patent No.: US 9,899,022 B2
(45) Date of Patent: Feb. 20, 2018

(54) MULTIMODAL INFORMATION PROCESSING DEVICE

(71) Applicant: MITSUBISHI ELECTRIC CORPORATION, Tokyo (JP)

(72) Inventors: Keigo Kawashima, Tokyo (JP); Takahiro Otsuka, Tokyo (JP); Tadashi Yamaura, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/103,359

(22) PCT Filed: Sep. 18, 2014

(86) PCT No.: PCT/JP2014/074673
§ 371 (c)(1),
(2) Date: Jun. 10, 2016

(87) PCT Pub. No.: WO2015/125329
PCT Pub. Date: Aug. 27, 2015

(65) Prior Publication Data
US 2016/0322047 A1 Nov. 3, 2016

(30) Foreign Application Priority Data
Feb. 24, 2014 (JP) .................................. 2014-033102

(51) Int. Cl.
*G10L 21/00* (2013.01)
*G10L 15/18* (2013.01)
(Continued)

(52) U.S. Cl.
CPC .......... *G10L 15/1815* (2013.01); *G06F 3/038* (2013.01); *H04L 12/2803* (2013.01);
(Continued)

(58) Field of Classification Search
CPC ............... G05B 15/02; G05B 19/0426; G05B 2219/23026; G06F 3/038; G06F 3/0482;
(Continued)

(56) References Cited

U.S. PATENT DOCUMENTS 5,878,274 A * 3/1999 Kono ...................... G06F 3/038
340/500
6,400,996 B1 * 6/2002 Hoffberg ............ G05B 19/0426
370/218
(Continued)

FOREIGN PATENT DOCUMENTS

JP 9-91112 A 4/1997
JP 11-24813 A 1/1999
(Continued)

OTHER PUBLICATIONS

Extended European Search Report dated Jun. 9, 2017, issued in the corresponding European Patent Application No. 14883349.4.
(Continued)

*Primary Examiner* — Vijay B Chawan
(74) *Attorney, Agent, or Firm* — Birch, Stewart, Kolasch & Birch, LLP (57) ABSTRACT

An output information generator generates abstract output information unrelated to the types of outputters according to information from an input unit. Semantic interpreters of the outputters generate pieces of embodied output information from the abstract output information on the basis of monitor results from status monitors which monitor the operating statuses of the corresponding outputters. Processing performers perform processes corresponding to the pieces of embodied output information.

7 Claims, 7 Drawing Sheets

(51) Int. Cl.
  *G06F 3/038* (2013.01)
  *H04L 12/28* (2006.01)
  *H04N 21/436* (2011.01)
  *G10L 15/22* (2006.01)

(52) U.S. Cl.
  CPC ............... *H04N 21/43615* (2013.01); *G06F 2203/0381* (2013.01); *G10L 2015/223* (2013.01)

(58) Field of Classification Search
  CPC .......... G06F 2203/038; G10L 15/1815; G10L 2015/223
  USPC .......... 700/17, 83, 1, 65, 700; 715/700, 810, 715/840, 841; 718/102; 719/318; 704/275, 270
  See application file for complete search history.

(56) References Cited

U.S. PATENT DOCUMENTS

| | | | | |
|---|---|---|---|---|
| 6,418,424 | B1* | 7/2002 | Hoffberg | G06F 3/00 386/E5.004 |
| 7,174,509 | B2* | 2/2007 | Sakai | G10L 13/00 704/246 |
| 8,583,263 | B2* | 11/2013 | Hoffberg | G05B 15/02 340/3.71 |
| 2002/0069276 | A1* | 6/2002 | Hino | H04L 12/2803 709/223 |
| 2006/0290709 | A1* | 12/2006 | Omi | G06F 3/038 345/594 |
| 2007/0046493 | A1* | 3/2007 | Park | H04L 12/2803 340/12.29 |
| 2011/0167110 | A1* | 7/2011 | Hoffberg | G05B 15/02 709/203 |

FOREIGN PATENT DOCUMENTS

| | | |
|---|---|---|
| JP | 2001-100878 A | 4/2001 |
| JP | 2001-265370 A | 9/2001 |

OTHER PUBLICATIONS

Sven Meyer, et al. "A Survey of Research on Context-Aware Homes", Advances in Ontologies, Australian Computer Society, Jan. 1, 2003, pp. 159-168.

Chinese Office Action dated Jul. 18, 2017 in corresponding Chinese Patent Application No. 201480075709.6, with machine translation.

Chinese Office Action dated Dec. 5, 2017 in corresponding Chinese Patent Application No. 201480075709.6, with machine translation.

Anonymous: "How to Make a Mac Talk: Text to Speech", dated Oct. 28, 2010, XP055423019, Retrieved from the Internet, pp. 1-7.

European Office Action dated Nov. 15, 2017 in corresponding EP Application No. 14 883 349.4.

* cited by examiner

MULTIMODAL INFORMATION PROCESSING DEVICE

FIELD OF THE INVENTION

The present invention relates to a multimodal information processing device for handling, as unified information, pieces of output information which are outputted to plural different pieces of output equipment and output devices.

BACKGROUND OF THE INVENTION

Conventionally, there is a method of, when outputting output information which is an identical object by using two or more types of output equipment and output devices (for example, a display, a sound reproducer, etc.), preparing output information (text data, voice data, etc.) for each of the pieces of output equipment and the output devices in advance. However, in the case of using such a method, design needs to be performed in advance on the assumption of the types of output equipment and output devices and the forms of pieces of output information outputted from them, and, when output equipment or an output device is modified, it is necessary to perform design again.

Therefore, in order to solve this problem, a device described in, for example, patent reference 1 includes a means of determining an output device, and a means of converting the data format of output information, and converts the data format of output information into a data format which the output device can process and outputs the output information to the output device, thereby implementing an information output system which does not have to take into consideration the forms of a plurality of output data in advance.

RELATED ART DOCUMENT

Patent Reference

Patent reference 1: Japanese Unexamined Patent Application Publication No. 2001-265370

SUMMARY OF THE INVENTION

Problems to be Solved by the Invention

Nowadays, the number of types of output equipment and output devices available in an information processing device increases with the diversification of output equipment and output devices, and there are an increasing number of cases in which output equipment or an output device is modified even after the system is configured.

However, a problem is that in a case in which, for example, an information processing device is configured in such a way as to have a means of determining an output processing device and a means of converting the data format of output information, as disclosed in patent reference 1, the information processing device must be designed again every time when connectable output equipment or an connectable output device is modified and every time when the data format of either one of pieces of output equipment and output devices is changed.

Further, because the information processing device is configured in such a way that each of the pieces of output equipment and the output devices generates output data which can be processed, it is necessary to design the information processing device in such a way that when each of the pieces of output equipment and the output devices performs output in consideration of the current status, the information processing device acquires the status of each of the pieces of output equipment and the output devices and generates output information corresponding to the acquired status. Therefore, a problem is that it is necessary to design again the information processing device every time when the operation of either one of the pieces of output equipment and the output devices is modified.

The present invention is made in order to solve the above-mentioned problems, and it is therefore an object of the present invention to provide a multimodal information processing device that does not have to be modified even when pieces of output equipment and output devices connected to the information processing device are modified.

Means for Solving the Problem

According to the present invention, there is provided a multimodal information processing device in which an outputter performs a process on the basis of input information, the multimodal information processing device including: an output information generator to generate abstract output information unrelated to the type of the outputter according to the input information, in which the outputter includes: a status monitor to monitor the operating status of the outputter; a semantic interpreter to generate embodied information from the abstract output information on the basis of a monitor result from the status monitor, and a processing performer to perform a process corresponding to the embodied information.

Advantages of the Invention

Because the multimodal information processing device of the present invention generates abstract output information unrelated to the type of the outputter according to the input information, and the outputter generates embodied information from the abstract output information on the basis of the result of monitoring the operating status thereof and performs a corresponding process, it is not necessary to modify the information processing device even when either output equipment or an output device connected to the information processing device is modified.

EMBODIMENTS OF THE INVENTION

Hereafter, in order to explain this invention in greater detail, the preferred embodiments of the present invention will be described with reference to the accompanying drawings.

Embodiment 1.

Figure 1:
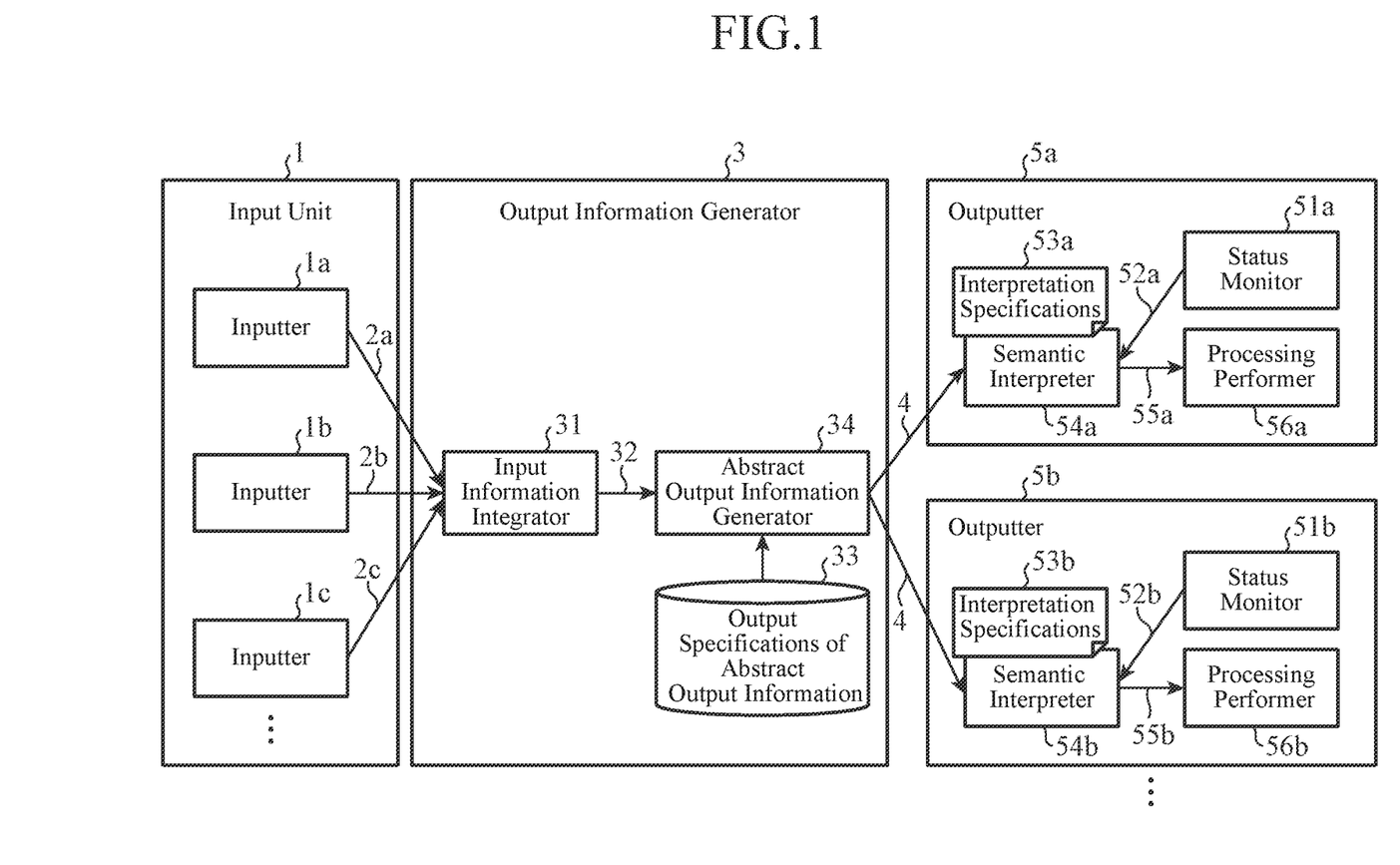
FIG. 1 is a block diagram showing a multimodal information processing device according to Embodiment 1 of the present invention.

FIG. 1 is a block diagram showing a multimodal information processing device according to Embodiment 1 of the present invention.

The multimodal information processing device shown in FIG. 1 includes an input unit 1, an output information generator 3 and outputters 5a, 5b, etc . . . . The input unit 1 is a processor that receives an input made by a user and an input from equipment, and is comprised of a plurality of inputters 1a, 1b, 1c, etc . . . . Each of these inputters 1a, 1b, 1c, etc . . . is a unit that acquires input information provided by a user, or a unit that acquires information from equipment, and their respective outputs are outputted to the output information generator 3 as pieces of input information 2a, 2b, 2c, etc . . . .

The output information generator 3 is a processor that generates output information independent of the outputters 5a, 5b, etc . . . from the pieces of input information 2a, 2b, 2c, etc . . . , and outputs the output information as abstract output information 4, so as to generate the output information in the information processing device, and includes an input information integrator 31, output specifications 33 of abstract output information, and an abstract output information generator 34. The input information integrator 31 is a processor that interprets the one or more pieces of input information 2a, 2b, 2c, etc . . . which are inputted from the input unit 1, and outputs them as abstract input information 32 which is input information independent of the inputters 1a, 1b, 1c, etc . . . . Further, the output specifications 33 of abstract output information are a database in which information showing a relation between each abstract input information 32 and abstract output information 4 is described. In addition, the abstract output information generator 34 is a processor that refers to the output specifications 33 of abstract output information, and generates abstract output information 4 from the abstract input information 32.

Each of the outputters 5a, 5b, etc . . . is either output equipment or an output device that generates output information which can be processed on the basis of the abstract output information 4 and performs a process. The outputters include status monitors 51a, 51b, etc . . . , interpretation specifications 53a, 53b, etc. . . . , semantic interpreters 54a, 54b, etc . . . , and processing performers 56a, 56b, etc . . . , respectively. An output device means a device, such as voice output equipment or a display which will be described later, having a relatively small number of components, or an element that constructs output equipment, and output equipment means equipment, such as an air conditioner, having a relatively large number of components, or a set of devices.

The status monitors 51a, 51b, etc . . . monitor the operating statuses of the outputters 5a, 5b, etc . . . , and output them as pieces of status information 52a, 52b, etc . . . , respectively. The interpretation specifications 53a, 53b, etc . . . are databases in which methods of interpreting the abstract output information 4 and the pieces of status information 52a, 52b, etc . . . are described, respectively. The semantic interpreters 54a, 54b, etc . . . are processors that generate pieces of embodied output information 55a, 55b, etc . . . , each of which is output information which either output equipment or an output device can process, from the abstract output information 4, the pieces of status information 52a, 52b, etc . . . , and the interpretation specifications 53a, 53b, etc . . . , respectively. The processing performers 56a, 56b, and . . . are processors each of which actually performs a process as either output equipment or an output device.

Each of the pieces of input information 2a, 2b, 2c, etc . . . which the inputter 1a, 1b, 1c, etc . . . acquire in the above-mentioned input unit 1 can be any type of information, such as an input signal from a hardware key or coordinate information of a mouse, text data about voice recognition or an inputted voice signal, an interpretation result of gesture recognition or an inputted image signal, or an operation completion signal of other equipment, as long as the information has a form including information available for the process.

The abstract input information 32 which the input information integrator 31 of the output information generator 3 generates can be any type of data, such as numerical data, text data, binary data, bit data, or data which is a combination of them, as long as the data is either information or has a data format which the abstract output information generator 34 can interpret regardless of the inputters 1a, 1b, 1c, etc . . . .

The output specifications 33 of abstract output information of the output information generator 3 are information for generating the abstract output information 4 from the abstract input information 32, and can be interpreted as an externally-defined file database described in the form of a tab-delimited text or in a markup language, such as XML, by the abstract output information generator 34 or can be coded into a program for the process of the abstract output information generator 34. The output specifications can be described in any type of form as long as they are described in a form which can associate the abstract input information 32 and the abstract output information 4 with each other.

The abstract output information 4 which the abstract output information generator 34 of the output information generator 3 generates can be any type of data, such as numerical data, text data, binary data, bit data, or data which is a combination of them, as long as the data is either information or has a data format which the abstract output information generator 34 can generate as output information independent of the outputters 5a, 5b, etc . . . .

Each of the pieces of status information 52a, 52b, and . . . which the status monitors 51a, 51b, etc . . . of the outputters 5a, 5b, etc . . . output can be information about the status of either output equipment or an output device itself, such as status information about a power supply, information about an operating task, or information about a completed task, or can be information about a surrounding environment, such as the air temperature, the humidity, or a noise situation in an area surrounding either output equipment or an output device.

The interpretation specifications 53a, 53b, etc . . . of the outputters 5a, 5b, etc . . . are information for generating the pieces of embodied output information 55a, 55b, etc . . . from the abstract output information 4 and the pieces of status information 52a, 52b, etc . . . , and can be interpreted as an externally-defined file database described in the form of a tab-delimited text or in a markup language, such as XML, by the semantic interpreters 54a, 54b, etc . . . , or can be coded into programs for the processes of the semantic interpreters 54a, 54b, etc . . . , respectively. The interpretation specifications can be described in any type of form as long as they are described in a form which can associate the abstract output information 4 and the pieces of status information 52a, 52b, etc . . . , and the semantic interpreters 54a, 54b, etc . . . with each other, respectively.

Each of the pieces of embodied output information 55a, 55b, and etc . . . which the semantic interpreters 54a, 54b, etc . . . of the outputters 5a, 5b, etc . . . generate is information which can be uniquely interpreted when either output equipment or an output device performs a process, and can be information, such as a voice signal, image data or a control signal, corresponding to either the output equipment or the output device.

The input unit 1, the output information generator 3 and the outputters 5a, 5b, etc . . . can be disposed on identical hardware. As an alternative, the input unit, the output information generator and the outputters can be connected to one another bidirectionally or unidirectionally by using a communication technique.

Next, the operation of the multimodal information processing device according to Embodiment 1 will be explained.

Figure 2:
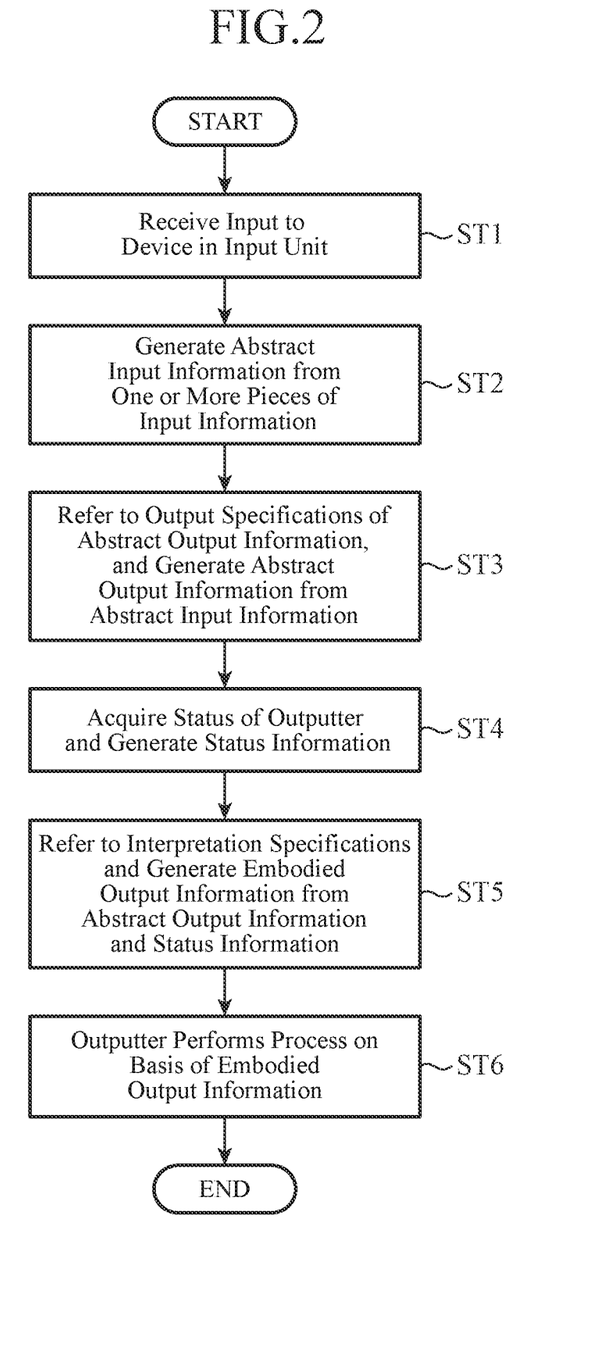
FIG. 2 is a flow chart showing the operation of the multimodal information processing device according to Embodiment 1 of the present invention.

FIG. 2 is a flow chart showing the operation of the multimodal information processing device according to Embodiment 1.

The input unit 1 receives one or more pieces of input information 2a, 2b, 2c, etc . . . inputted to the multimodal information processing device from the one or more inputters 1a, 1b, 1c, etc . . . , and outputs the pieces of input information to the output information generator 3 (step ST1). An input to each of the inputters 1a, 1b, 1c, etc . . . can be an input direct from a user, such as a keyboard input or a mouse input, or an input followed by an interpretation on the user's action, such as voice recognition or gesture recognition. As an alternative, an input to each of the inputters can be an input from another system or device.

In next step ST2, the input information integrator 31 of the output information generator 3 interprets the intention of the input from the one or more pieces of input information 2a, 2b, 2c, etc . . . inputted from the input unit 1, to generate abstract input information 32 which is abstracted input information independent of the inputters 1a, 1b, 1c, etc . . . , and outputs the abstract input information to the abstract output information generator 34.

As to the operation of the input information integrator 31 in step ST2, for example, the method described in Japanese Unexamined Patent Application Publication No. Hei 11-24813 can be used. In this reference, as an example, a method of converting input information into a generalized command script on the basis of dictionary data is described. As an alternative, a known method of acquiring one input result from one or more pieces of input information can be used.

As an alternative, abstract input information 32 which can be interpreted regardless of the inputters can be inputted directly from a predetermined input device. In this case, the output information generator 3 should just be comprised of the output specifications 33 of abstract output information and the abstract output information generator 34.

In next step ST3, the abstract output information generator 34 refers to the output specifications 33 of abstract output information and generates abstract output information 4 from the abstract input information 32, and outputs the abstract output information to the outputters 5a, 5b, etc . . . .

Figure 3:
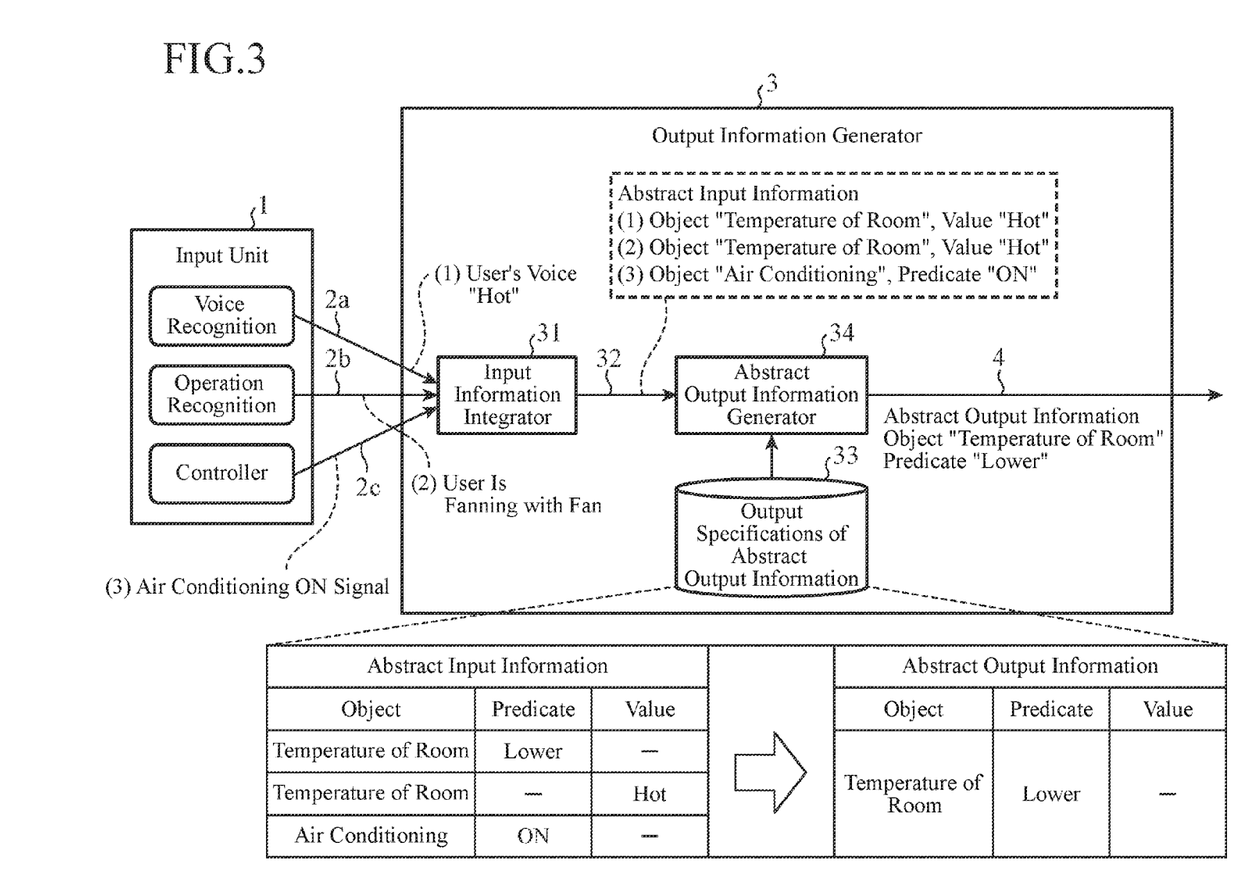
FIG. 3 is an explanatory drawing showing a process of generating abstract output information of the multimodal information processing device according to Embodiment 1 of the present invention.

FIG. 3 is an explanatory drawing showing the process of generating the abstract output information 4 which is performed by the output information generator 3.

It is assumed that the abstract input information 32 and the abstract output information 4, which are illustrated in FIG. 3, are pieces of information each of which is comprised of an "object" showing the target of the information, a "predicate" showing the operation of the information, and a "value" showing the variable value of the information.

FIG. 3 shows an example in which pieces of input information 2a, 2b, 2c, etc . . . are inputted from a plurality of inputters (voice recognition, operation recognition, and a controller). Further, in the example of FIG. 3, a case in which the outputters 5a, 5b,etc . . . are disposed as an air conditioner, and control of this air conditioner is performed is shown, as will be described later by using FIG. 4.

The input information integrator 31 converts the pieces of input information 2a, 2b, 2c, etc . . . to pieces of abstract input information 32. Both input information which is acquired by performing voice recognition on a user's utterance "It's hot." and input information which is acquired by performing operation recognition on the user's operation of "fanning" are converted into an object "the temperature of the room" and a value "hot" which are identical abstract input information 32. Further, when a signal "air conditioning ON" is inputted directly from a controller, the signal is converted into abstract input information including an object "air conditioning" and a predicate "ON."

Because the output specifications 33 of abstract output information are a database which associates each abstract input information 32 and abstract output information 4 with each other, the abstract output information generator 34 refers to the output specifications 33 of abstract output information and generates the corresponding abstract output information 4. The example shows that either of the pieces of abstract input information 32 has an output specification of performing an identical process, and is converted into abstract output information 4 including an object "the temperature of the room" and a predicate "lower."

Although in the example of FIG. 3 each of the pieces of abstract input information 32 and the abstract output information 4 is expressed by three pieces of information including an "object", a "predicate" and a "value" after being divided according to roles, each of them can be alternatively expressed by a single piece of information and can also include other information such as an input device, an output device, or reliability. Further, the pieces of abstract input information 32 and the abstract output information 4 can have different forms. Further, although in the example of FIG. 3 the output specifications 33 of abstract output information are defined as information which associates each abstract input information 32 and abstract output information 4, as a pair, with each other, the output specifications can be information which can generate output information on the basis of a series of consecutive pieces of input information such as state transitions.

The explanation made up to here is about the process of generating abstract output information 4 in step ST3 of FIG. 2, which is performed by the output information generator 3.

Instead of inputting pieces of abstract input information 32 from the inputters 1a, 1b, 1c, etc . . . , the output information generator 3 itself can be made to generate abstract input information 32. For example, certain abstract input information 32 can be received at fixed time intervals.

In this case, the multimodal information processing device can be configured with the output information generator 3 and the outputters 5a, 5b, etc . . . , and the output information generator 3 can be configured with the output specifications 33 of abstract output information and the abstract output information generator 34.

In next step ST4, the status monitors 51a, 51b, etc . . . of the outputters 5a, 5b, etc . . . acquire the current statuses of the outputters 5a, 5b, etc . . . , and output the current statuses to the semantic interpreters 54a, 54b, and . . . as pieces of status information 52a, 52b, etc . . . , respectively. Hereafter, operations common to the outputters 5a, 5b, etc . . . will be explained as operations of the status monitor 51, the status information 52, the interpretation specifications 53, the semantic interpreter 54, the embodied output information 55, and the processing performer 56 in each outputter 5.

The status information 52 can be provided by acquiring the internal state of either output equipment or an output device, such as the state of a power supply or an operating task, or by acquiring information about a surrounding environment of either output equipment or an output device by using one of various sensors, such as a temperature sensor, an anemometer and a noise meter. What is necessary is just to combine one or more of those pieces of information as the status information.

In next step ST5, the semantic interpreter 54 of the outputter 5 generates output information which either output equipment or an output device can perform from the abstract output information 4 inputted from the output information generator 3 and the status information 52 inputted from the status monitor 51, by referring to the interpretation specifications 53, and outputs the output information to the processing performer 56 as embodied output information 55.

Figure 4:
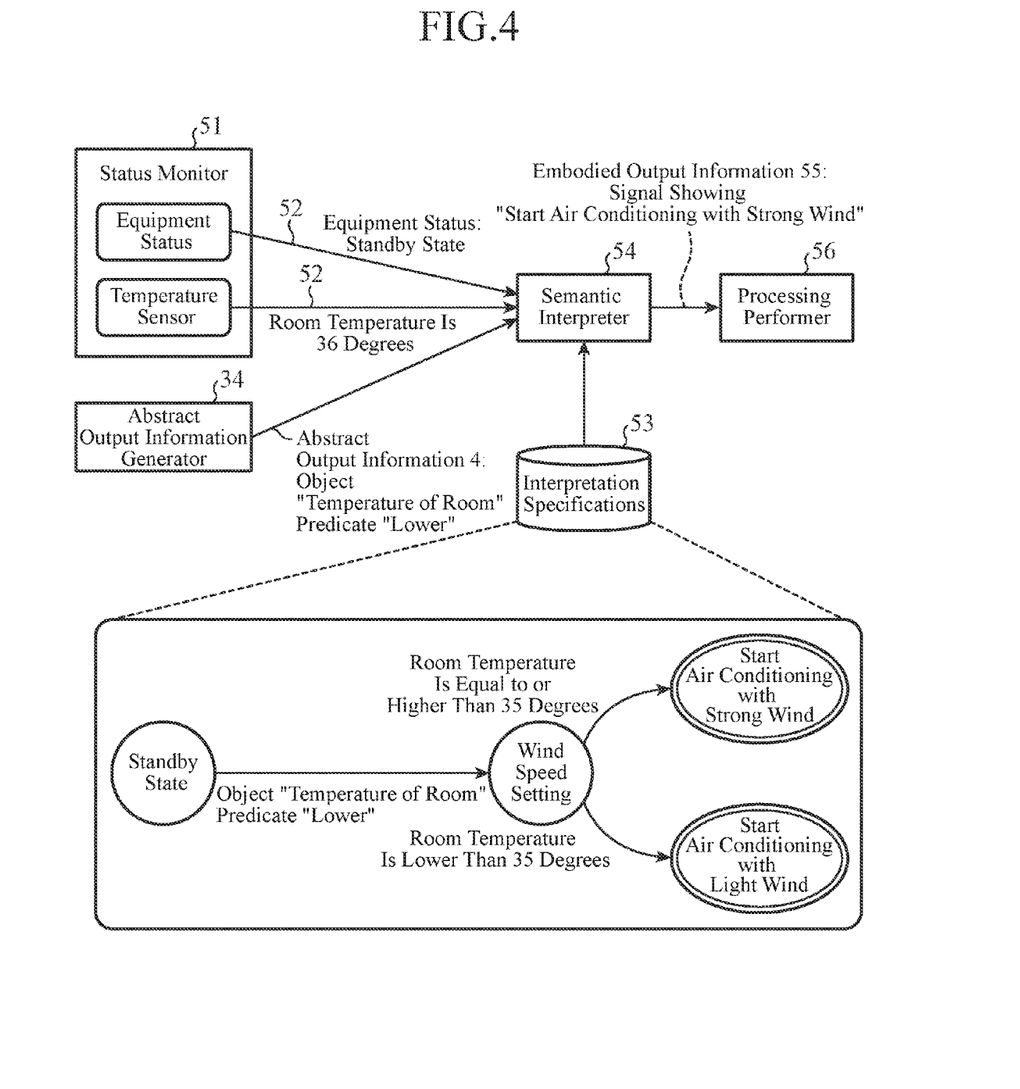
FIG. 4 is an explanatory drawing showing a process of generating embodied output information of the multimodal information processing device according to Embodiment 1 of the present invention.

FIG. 4 is an explanatory drawing showing the process of generating embodied output information 55 which is performed by the semantic interpreter 54.

The interpretation specifications 53 illustrated in FIG. 4 express state transitions which make it possible to set up embodied output information 55 corresponding to the state information 52 and the abstract output information 4.

FIG. 4 shows an example in which abstract output information 4 showing that the temperature of the room is lowered is inputted to the air conditioner which is the outputter 5, and status information 52 showing that the air conditioner is in a standby state and the room temperature is 36 degrees is inputted to the semantic interpreter 54. The semantic interpreter 54 receives the abstract output information 4 (an object "the temperature of the room" and a predicate "lower") and makes a transition from the "standby state" to a "wind speed setting state" on the basis of the state transitions in the interpretation specifications 53. In addition, the semantic interpreter receives the status information 52 showing the room temperature is 36 degrees, and enters a state of outputting "start air conditioning with a strong wind", and outputs a signal showing "start air conditioning with a strong wind" to the processing performer 56 as embodied output information 55.

Further, although in the example of FIG. 4 the interpretation specifications 53 are expressed as state transitions which are information which makes it possible to generate output information on the basis of a series of consecutive pieces of input information, the interpretation specifications can be alternatively expressed by using anther expressing method or can be alternatively information which associates the abstract output information 4 and the embodied output information 55, as a pair, with each other.

The explanation made up to here is about the process of generating embodied output information 55 in step ST5 of FIG. 2, which is performed by the semantic interpreter 54.

The semantic interpreter 54 can be configured in such a way as to receive user information instead of the status information 52. The user information can be information, such as an ID, showing a specific user, or can be alternatively information showing male or female, or a group sensitive to heat, cold or the like. As an alternative, the user information can be information directly showing the type of operation, such as a high frequency of setting a strong wind or a light wind.

In that case, the interpretation specifications 53 express state transitions which make it possible to set up embodied output information 55 corresponding to the user information and the abstract output information 4, and the semantic interpreter 54 generating embodied output information 55 corresponding to the abstract output information 4 and the user information, thereby making it possible for the outputter to perform an operation and a function according to the user who uses the outputter.

Further, the semantic interpreter 54 can be configured in such a way as to receive the status information 52 and the user information. In that case, the interpretation specifications 53 express state transitions which make it possible to set up embodied output information 55 corresponding to the status information 52, the user information and the abstract output information 4, and the semantic interpreter 54 generates embodied output information 55 corresponding to the abstract output information 4, the status information 52 and user information, thereby making it possible for the outputter to perform an operation and a function according to the user who uses the outputter.

An example of the operation in the case in which, for example, the semantic interpreter 54 receives the status information 52 and the user information is as follows. More specifically, in an example in which abstract output information 4 showing that the temperature of the room is lowered is inputted to the air conditioner which is the outputter 5, and both status information 52 showing that the air conditioner is in a standby state and the room temperature is 36 degrees and user information showing that a strong wind is preferred at the time of high temperature are inputted to the semantic interpreter 54, the semantic interpreter 54 receives the abstract output information 4 (an object "the temperature of the room" and a predicate "lower"), and makes a transition from the "standby state" to a "wind speed setting state" on the basis of the state transitions in the interpretation specifications 53. In addition, the semantic interpreter receives both the status information 52 showing that the room temperature is 36 degrees and the user information showing that a strong wind is preferred at the time of high temperature, and enters a state of outputting "start air conditioning with a strong wind" and outputs a signal showing "start air conditioning with a strong wind" to the processing performer 56 as embodied output information 55.

Further, the semantic interpreter 54 can receive the status information 52 about another outputter 5. In a case in which the semantic interpreter is configured in this way, an operation and a function corresponding to the other outputter 5 can be performed. For example, when the coordinates of equipment are set up and displayed on a display, the semantic interpreter receives one abstract output information 4 meaning that the coordinates are set, and the operation equipment whose coordinates are set up outputs completion information as status information 52 at the time when the setup of the coordinates is completed, so that the display is enabled to perform an interlocked operation, such as an operation of displaying the coordinates, after receiving the completion information from the operation equipment.

The semantic interpreter 54 can be alternatively configured in such a way as to process only the abstract output information 4 defined in the interpretation specifications 53.

In next step ST6, the processing performer 56 of each outputter 5 performs an operation as the outputter 5 on the basis of the embodied output information 55 inputted from the semantic interpreter 54.

Figure 5:
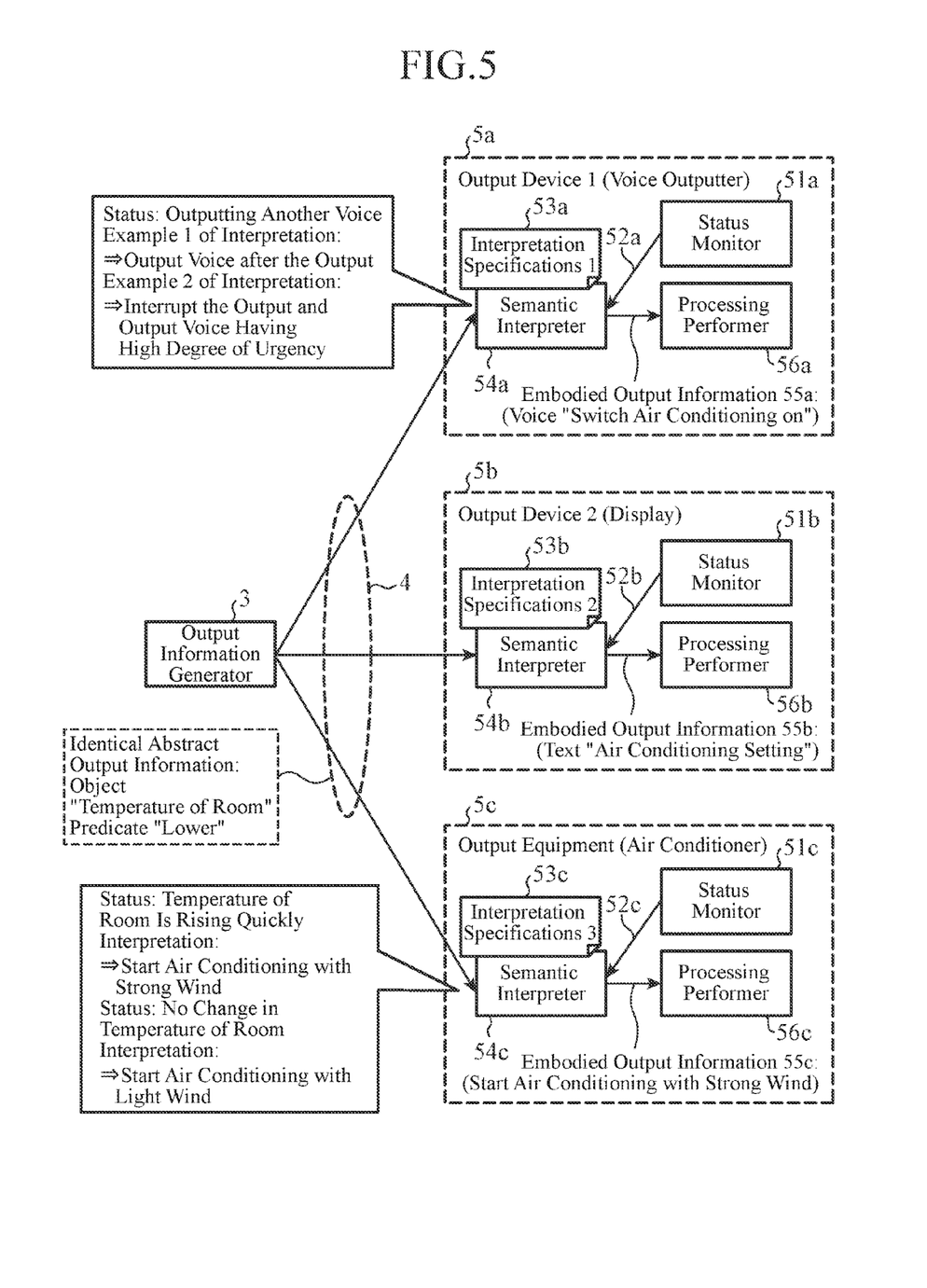
FIG. 5 is an explanatory drawing showing processing in a case in which a plurality of outputters are connected in the multimodal information processing device according to Embodiment 1 of the present invention.

FIG. 5 is an explanatory drawing showing processing in a case in which a plurality of outputters 5a, 5b, 5c, etc . . . are connected.

The outputters 5a, 5b, 5c, etc . . . illustrated in FIG. 5 consist of an output device 1 (voice output equipment), an output device 2 (display) and output equipment (air conditioner) that perform outputs having different forms.

FIG. 5 shows an example in which the output information generator 3 outputs abstract output information 4 showing that the temperature of the room is lowered. The identical abstract output information 4 is inputted to the semantic interpreters 54a, 54b, 54c, etc . . . of the outputters 5a, 5b, 5c, etc . . . , and outputs corresponding to the pieces of status information 52a, 52b, 52c, etc . . . and the interpretation specifications 53a, 53b, 53c, etc . . . of the outputters 5a, 5b, 5c, etc . . . are performed.

The outputter 5a (output device 1 (voice output equipment)) monitors the voice regenerating condition of equipment, and sets the voice regenerating condition as status information 52a. The semantic interpreter 54a generates voice data "switch air conditioning on" and sets this voice data as embodied output information 55a, but, when the equipment is outputting another voice, outputs embodied output information 55a which causes output of the voice after the equipment has outputted the other voice. Further, the interpretation specifications 53a can be designed and processed in such a way that, when there is an urgent message, the current output is interrupted and the message is outputted.

The outputter 5b (output device 2 (display)) generates a text "air conditioning setting" which is different from that of the output device 1, as embodied output information 55b, from the same abstract output information 4, and outputs the embodied output information.

The outputter 5c (output equipment (air conditioner)) monitors the temperature of the room, and sets this temperature as status information 52c.

The semantic interpreter 54c outputs embodied output information 55c showing start of air conditioning from the same abstract output information 4. According to the interpretation specifications 53c, the semantic interpreter outputs embodied output information 55c showing start of air conditioning with a strong wind in a status in which the temperature of the room is rising quickly, whereas the semantic interpreter outputs embodied output information 55c showing start of air conditioning with a light wind in a status in which there isn't very much change in the temperature of the room.

As mentioned above, from the same abstract output information 4, pieces of embodied output information 55a, 55b, 55c, etc . . . corresponding to the statuses and the interpretation specifications 53a, 53b, 53c, etc . . . of the outputters 5a, 5b, 5c, etc . . . are generated.

The explanation made up to here is about the processing when the plurality of outputters 5a, 5b, 5c etc . . . shown in FIG. 5 are connected.

As previously explained, because the multimodal information processing device according to Embodiment 1, in which an outputter performs a process on the basis of input information, includes the output information generator that generates abstract output information unrelated to the type of the outputter according to the input information, and the outputter includes: the status monitor that monitors the operating status of the outputter; the semantic interpreter that generates embodied information from the abstract output information on the basis of a monitor result from the status monitor; and the processing performer that performs a process corresponding to the embodied information, it is not necessary to modify the information processing device even when either output equipment or an output device connected to the information processing device is modified.

Further, the multimodal information processing device according to Embodiment 1 is configured in such a way that the output information generator generates abstract output information independent of both pieces of output equipment and output devices from the abstract input information, and each output equipment and each output device generate and execute embodied output information which can be executed thereby according to the status information. As a result, there is provided an advantage of eliminating the necessity for the output information generator to take into consideration the statuses and the operations of each output equipment and each output device, and simplifying the design and the control, as compared with a case in which the output information generator generates embodied output information, and hence it is necessary to design the output information generator in consideration of the statuses of all pieces of output equipment and all output devices.

Further, there is provided an advantage of eliminating the necessity to modify the output information generator also when either output equipment or an output device connected is modified or the operation of either output equipment or an output device is modified, and also when the installation location of either output equipment or an output device is moved and then the status to be considered is changed, and therefore making it possible to easily modify either the output equipment or the output device.

Further, because the output information generator is configured in such a way as to output identical abstract output information independently of the types of pieces of output equipment and output devices, there is provided an advantage of eliminating the necessity for the output information generator to hold the information about the pieces of equipment and the devices which can be its output destinations, and being able to eliminate the process of selecting equipment and a device which are its output destinations.

Further, because in each output equipment and each output device, a process is performed on only abstract output information for which a method generating embodied output information is defined, there is provided an advantage of eliminating the necessity to define processes for all pieces of abstract output information in each output equipment and each output device, and hence being able to simplify the design.

Further, because the multimodal information processing device according to Embodiment 1 is configured in such a way that the outputter includes the interpretation specifications showing a relation between each abstract output information and embodied information, and the semantic interpreter interprets each abstract output information by referring to the interpretation specifications and generates embodied information, there is provided an advantage of being able to implement a different operation and a different function from identical output information, as compared with a case in which operations corresponding to specific output signals are defined in advance.

Further, because the multimodal information processing device according to Embodiment 1 is configured in such a way that the semantic interpreter performs the interpretation in consideration of information about a user using the outputter, the information being related to the operating status of the outputter, there is provided an advantage of being able to implement an operation and a function corresponding to a user who uses either output equipment or an output device.

Further, because the multimodal information processing device according to Embodiment 1 is configured in such a way that the semantic interpreter performs the interpretation on the basis of a monitor result from the status monitor of another outputter different from the outputter, a plurality of pieces of output equipment and a plurality of output devices can implement interlocked operations and functions from identical abstract output information.

Further, because the multimodal information processing device according to Embodiment 1 is configured in such a way that the output information generator includes the input information integrator that generates abstract input information unrelated to the type of the input information, and generates abstract output information on the basis of the abstract input information, the multimodal information processing device can deal with any type of input information.

Embodiment 2

Although the multimodal information processing device according to above-mentioned embodiment 1 is configured in such a way that each outputter performs a process according to abstract output information outputted by the output information generator, an example in which an output information generator acquires the status of an outputter and a multimodal information processing device performs an output information generating process interlocked with the outputter will be explained next as Embodiment 2.

Figure 6:
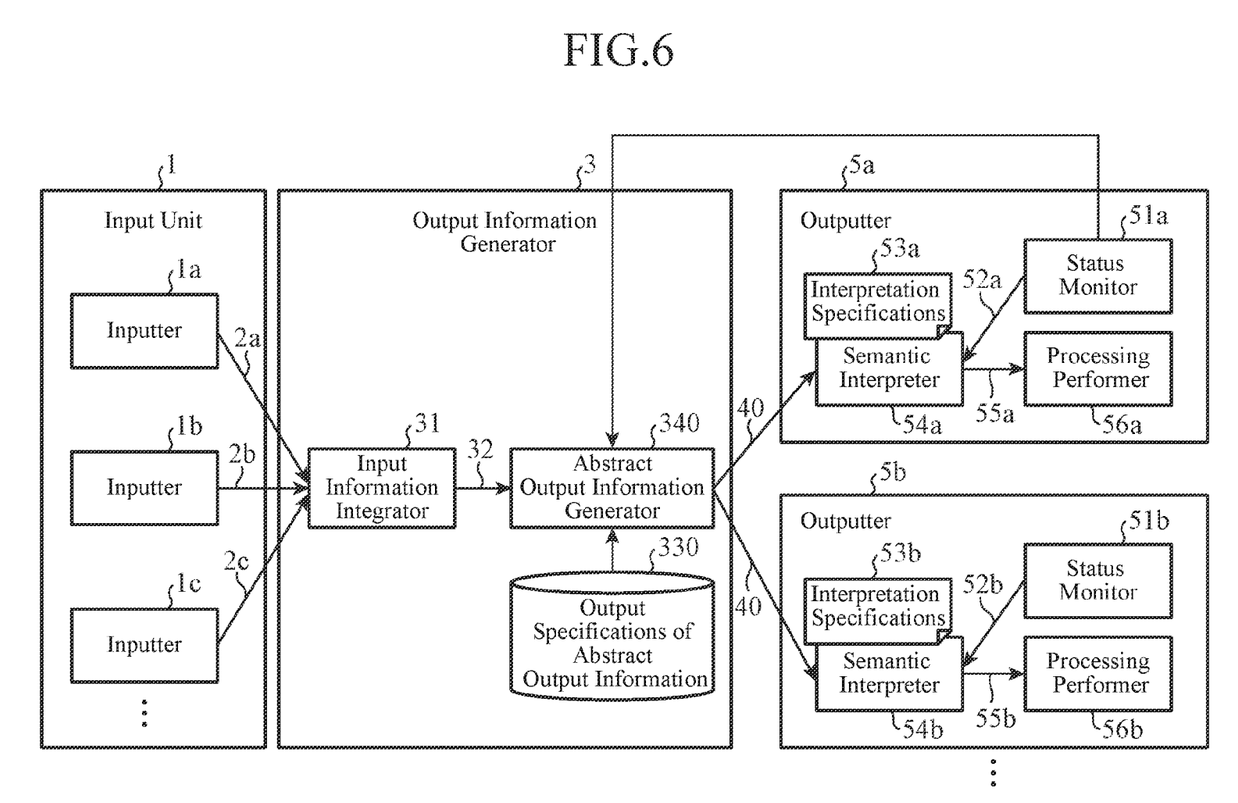
FIG. 6 is a block diagram showing a multimodal information processing device according to Embodiment 2 of the present invention.

FIG. 6 is a block diagram of the multimodal information processing device according to Embodiment 2.

As illustrated in this figure, the multimodal information processing device is comprised of an input unit 1, an output information generator 30, and one or more outputters 5a, 5b, etc . . . . The input unit 1 is the same as that according to Embodiment 1. Further, because an input information integrator 31 and generated abstract input information 32 in the output information generator 3 are the same as those according to Embodiment 1, the explanation of the components will be omitted hereafter.

An abstract output information generator 340 of the output information generator 30 is configured in such a way as to receive abstract status information 57 outputted from a status monitor 51a of the outputters 5a, 5b, etc . . . , together with the abstract input information 32, and generate abstract output information 40 on the basis of output specifications 330 of abstract output information. The output specifications 330 of abstract output information are a database including abstract status information 57 in addition to abstract input information 32 shown in Embodiment 1, and showing a relation between each set of those pieces of information and abstract output information 40.

The outputters 5a, 5b, etc . . . have the basic configurations as those according to Embodiment 1, and include status monitors 51a, 51b, etc . . . , interpretation specifications 53a, 53b, etc . . . , semantic interpreters 54a, 54b, etc . . . , and processing performers 56. On the other hand, the multimodal information processing device according to Embodiment 2 is configured in such a way that abstract status information 57 is outputted from the status monitors 51a, 51b, etc . . . , and in the example shown in FIG. 6 the multimodal information processing device is configured in such a way that abstract status information 57 is outputted from the status monitor 51a of the outputter 5a.

Next, the operation of the multimodal information processing device according to Embodiment 2 will be explained.

Figure 7:
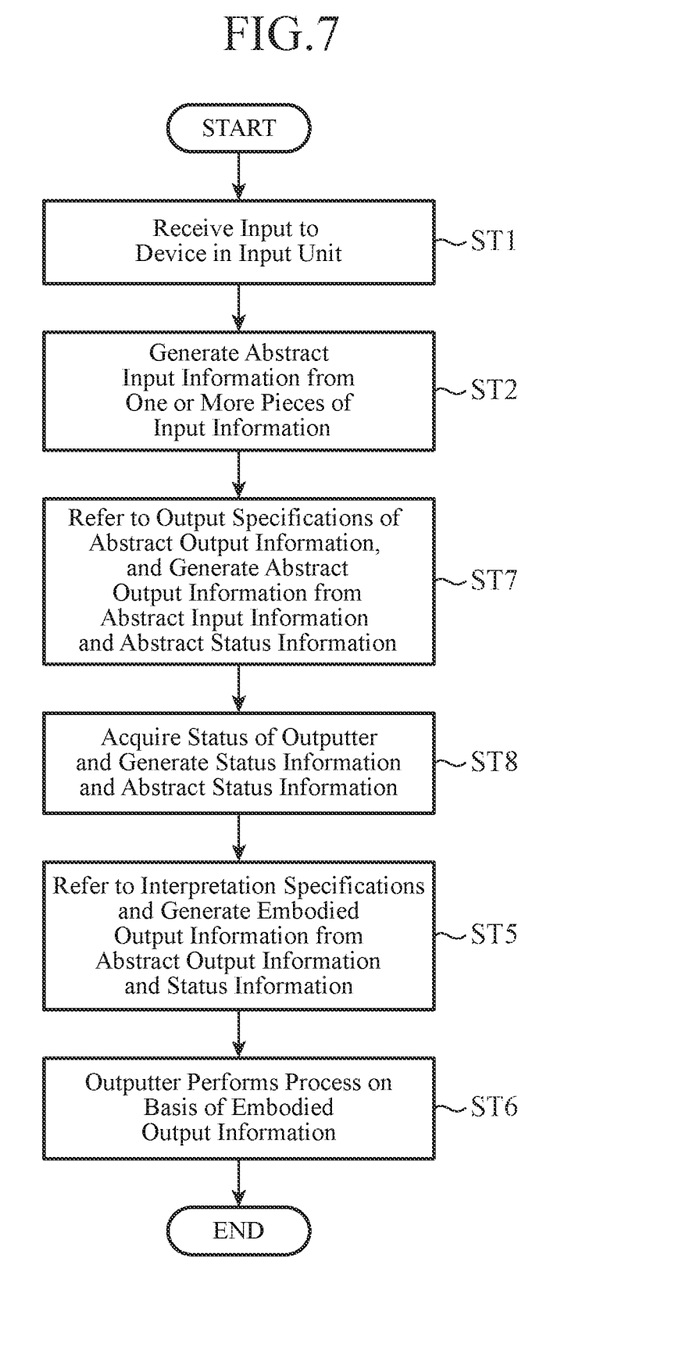
FIG. 7 is a flow chart showing the operation of the multimodal information processing device according to Embodiment 2 of the present invention.

FIG. 7 is a flow chart showing the operation of the multimodal information processing device according to Embodiment 2. Because processes of up to step ST2 are the same as those in the flow chart of FIG. 2 in Embodiment 1, the explanation of the process will be omitted hereafter.

After the input information integrator 31, in step ST2, generates abstract input information 32, the abstract output information generator 340 refers to the output specifications 330 of abstract output information, to generate abstract output information 40 from the abstract input information 32 and the abstract status information 57, and outputs the abstract output information to the outputters 5a, 5b, etc . . . (step ST7). The other operation is the same as that in step ST3 of Embodiment 1.

In this embodiment, the abstract status information 57 is described in the same form as that of the abstract input information 32, and is handled in the same way. For example, the abstract status information is described as follows.

Status in which a power supply has been switched on
   Object: Status of power supply of equipment
   Predicate: ON
   Value: Equipment name
Information about a completed task
   Object: Task
   Predicate: Completion
   Value: Task name As a result, the internal information of the abstract output information generator 34a is modified, and operations corresponding to subsequent inputs are modified. For example, a modification to operations, as will be mentioned below, is made.

Example 1) only when the power supply of equipment A is in ON state, abstract output information 40 showing that the equipment A and other equipment cooperate with each other is outputted according to subsequent abstract input information 32.

Example 2) abstract output information 40 which switches on the power supply of the equipment B is outputted in response to abstract status information 57 showing that the power supply of the equipment A has been switched on.

In next step ST8, the status monitors 51a, 51b, etc . . . of the outputters 5a, 5b, etc . . . acquire the current statuses of the outputters 5a, 5b, etc . . . , and output the current statuses to the semantic interpreters 54a, 54b, etc . . . as pieces of status information 52a, 52b etc . . . , respectively. This process is the same as the operation of step ST4 in Embodiment 1. Further, in Embodiment 2, the status information 52a is converted into abstract information having the same form as the abstract input information 32, the abstract information being independent of the outputters 5a, 5b, etc . . . , and is outputted to the abstract output information generator 34a as abstract status information 57.

Because operations of steps ST5 and ST6 are the same as those in the flow chart of the FIG. 2 in Embodiment 1, the explanation of the operations will be omitted hereafter.

Although in the above-mentioned example the outputters 5a, 5b, etc . . . are configured in such a way as to generate abstract status information 57 and input this abstract status information to the abstract output information generator 340, the pieces of status information 52a, 52b, etc . . . can be alternatively inputted to the input information integrator 31 and handled as pieces of input information 2a, 2b, 2c, etc . . . inputted to the input information integrator 31.

Further, although in the above-mentioned example the abstract status information 57 is outputted from only the outputter 5a, pieces of abstract status information can be alternatively outputted from the plurality of outputters 5a, 5b, etc . . . . In this case, the abstract output information generator 340 generates one or more pieces of abstract output information 40 on the basis of the plurality of pieces of abstract status information 57. As an alternative, the abstract output information generator 340 can generate a plurality of pieces of abstract output information 40 from one abstract status information 57.

As previously explained, because the multimodal information processing device according to Embodiment 2 is configured in such a way that the output information generator generates abstract output information on the basis of a monitor result from the status monitor of an outputter, there is provided an advantage of making it possible for the output information generator to generate abstract output information in consideration of the status of the outputter.

Further, because the multimodal information processing device according to Embodiment 2 is configured in such a way that the output information generator includes the input information integrator that receives the monitor result from the status monitor of the outputter as an input, and generates abstract status information described in the same form as the abstract input information, and generates abstract output information on the basis of the abstract input information and the abstract status information, the multimodal information processing device can deal with even a monitor result from any type of status monitor.

While the invention has been described in its preferred embodiments, it is to be understood that an arbitrary combination of two or more of the above-mentioned embodiments can be made, various changes can be made in an arbitrary component according to any one of the above-mentioned embodiments, and an arbitrary component according to any one of the above-mentioned embodiments can be omitted within the scope of the invention.

INDUSTRIAL APPLICABILITY

Because the multimodal information processing device according to the present invention generates abstract output information unrelated to the type of an outputter according to input information, and the outputter generates embodied information from the abstract output information on the basis of a result of monitoring the operating status of the outputter and performs a corresponding process, the information processing device does not have to be modified even when either output equipment or an output device connected to the information processing device is modified, and is suitable for use in an information output system that outputs information to a plurality of different pieces of output equipment and a plurality of different output devices.

EXPLANATIONS OF REFERENCE NUMERALS 1 input unit, 1a, 1b, 1c inputter, 2a, 2b, 2c input information, 3, 30 output information generator, 31 input information integrator, 32 abstract input information, 33, 330 output specification of abstract output information, 34, 340 abstract output information generator, 4, 40 abstract output information, 5a, 5b, 5c outputter, 51a, 51b status monitor, 52a, 52b status information, 53a, 53b interpretation specification, 54a, 54b semantic interpreter, 55a, 55b embodied output information, and 56a, 56b, processing performer.

The invention claimed is:

1. A multimodal information processing device comprising:
one or more types of output device to perform an individual process based on embodied information; and
an output information generator to convert input information input to the multimodal information processing device into abstract output information being independent of the types of the output device, and supply the output device with the abstract output information, wherein
the output device comprises:
a status monitor to obtain status information by monitoring an operating status of said output device;
a semantic interpreter to generate, from said abstract output information, embodied information which depends on the obtained status information and a type of said output device; and
a processing performer to perform a process corresponding to said embodied information.

2. The multimodal information processing device according to claim 1, wherein said output device further includes interpretation specifications showing a relation between said abstract output information and said embodied information, and said semantic interpreter interprets said abstract output information by referring to said interpretation specifications and generates said embodied information.

3. The multimodal information processing device according to claim 1, wherein said semantic interpreter performs interpretation in consideration of information about a user using said output device, the information being related to the operating status of said output device.

4. The multimodal information processing device according to claim 1, wherein said semantic interpreter performs interpretation on a basis of status information obtained by a status monitor of another output device different from said output device.

5. The multimodal information processing device according to claim 1, wherein said output information generator generates said abstract output information on a basis of the status information.

6. The multimodal information processing device according to claim 1, wherein said output information generator comprises an input information integrator to generate abstract input information independent of a type of said input information, and generates said abstract output information on a basis of said abstract input information.

7. The multimodal information processing device according to claim 1, wherein said output information generator comprises an input information integrator to receive the status information from the status monitor as an input and generate abstract status information which is described in same form as said abstract input information, and generates said abstract output information on a basis of said abstract input information and said abstract status information.

* * * * *